United States Patent
Kley et al.

(10) Patent No.: US 7,681,391 B2
(45) Date of Patent: Mar. 23, 2010

(54) HYDRODYNAMIC COUPLING

(75) Inventors: Markus Kley, Ellwangen (DE); Reinhold Pittius, Crailsheim (DE); Kurt Adleff, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 284 days.

(21) Appl. No.: 11/721,231

(22) PCT Filed: Dec. 12, 2005

(86) PCT No.: PCT/EP2005/013321

§ 371 (c)(1), (2), (4) Date: Jun. 8, 2007

(87) PCT Pub. No.: WO2006/061252

PCT Pub. Date: Jun. 15, 2006

(65) Prior Publication Data

US 2008/0209901 A1    Sep. 4, 2008

(30) Foreign Application Priority Data

Dec. 10, 2004   (DE) .................. 10 2004 059 833

(51) Int. Cl.
*F16D 33/06* (2006.01)
(52) U.S. Cl. ....................................................... 60/360
(58) Field of Classification Search ................ 60/347, 60/359, 360
See application file for complete search history.

(56) References Cited

U.S. PATENT DOCUMENTS

| 2,873,831 | A |   | 2/1959  | Sinclair              |
|-----------|---|---|---------|-----------------------|
| 2,916,881 | A | * | 12/1959 | Cheek ............ 60/360 |
| 4,781,020 | A | * | 11/1988 | Schust et al. ...... 60/360 |
| 6,357,229 | B1|   | 3/2002  | Schust et al.         |

FOREIGN PATENT DOCUMENTS

| DE | 32 17 465 | 11/1983 |
| FR | 1.016.938 | 2/1950  |
| GB | 2 227 078 | 7/1990  |
| WO | 98/32987  | 7/1998  |

* cited by examiner

*Primary Examiner*—Michael Leslie
(74) *Attorney, Agent, or Firm*—Baker & Daniels LLP

(57) ABSTRACT

The invention relates to a hydrodynamic coupling comprising an impeller (1), which propels a drive machine and a turbine wheel (2), which propels a drive machine. The turbine wheel and its rotationally fixed coupling shell (4) form a coupling housing (5). A centrifugal force valve (6) comprising a valve body (6.1) that is actuated using centrifugal force, is located in the outer peripheral region of the coupling housing, said valve being mounted in an outlet (7) for working medium from the working chamber, in such a way that the valve body essentially or completely seals the outlet when the centrifugal force valve is closed and releases said outlet when the valve is open, allowing the working medium to flow out. The valve body of the centrifugal force valve is supplied with working medium exclusively on its radial inner face and its radial outer face is subjected exclusively to the action of an elastic, mechanical pressure element (6.2), which acts in the closing direction of the centrifugal force valve.

20 Claims, 2 Drawing Sheets

HYDRODYNAMIC COUPLING

CROSS-REFERENCE TO RELATED APPLICATION

This application is related to and claims the benefit under 35 U.S.C. §119 and 35 U.S.C. §365 of International Application No. PCT/EP2005/013321, filed Dec. 12, 2005.

BACKGROUND OF THE INVENTION

The invention relates to a hydrodynamic coupling and especially a compressed-air system for motor vehicles with such a hydrodynamic coupling.

Hydrodynamic couplings are known in a large number of configurations and in various applications, especially in the field of motor vehicles. It was proposed recently for example that a hydrodynamic coupling be provided in the drive train between an automotive engine, which is usually an internal combustion engine, and an air compressor of the compressed-air system of the motor vehicle in order to switch the compressor on and off via the hydrodynamic coupling. According to a special embodiment, the present invention relates to just such a compressed-air system for motor vehicles, especially for motor vehicles such as trucks.

Such a compressor, which is also known as an air compressor, in a vehicle is designed for a specific operating speed or for a speed range beneath the maximum speed which at least should not be exceeded permanently. 3000 revolutions per minute are permanently permitted for such a compressor for example, with the compressor being allowed to briefly also reach 3500 revolutions per minute. This relates especially to reciprocating piston air compressors. The coupling in accordance with the invention shall be configured for such a compressor for example.

In practice, it has proven to be advisable with respect to overall size and efficiency that the drive speed of the coupling is increased by adjusting the transmission when using a hydrodynamic coupling in the drive train between automotive engine and compressor. This can lead to operational states in which the pump side reaches up to 4500 revolutions per minute in air conveying operation. In the case of normal slip in the coupling, the turbine side which usually revolves at the same speed as the input shaft of the compressor will accordingly also exceed the said maximum permissible speed. Measures are therefore necessary in order to protect the compressor from respective excessive speed.

Although it is principally known to control the speed of a work machine by means of a hydrodynamic coupling by setting the degree of filling of the hydrodynamic coupling which is interposed between the engine and the work machine (see for example the published patent specification WO 98/32987). The control of the filling occurs substantially in such a way that the supply of working medium is interrupted upon reaching a maximum degree of filling of the working chamber.

The known feedback control for the filling quantity is complex with respect to the instrumental configuration and requires various feedback control components such as pressure sensors, valves and/or scooping pipes. Especially when a hydrodynamic coupling is used in a vehicle advantageously in the drive train between the air compressor and the drive engine in order to switch the air compressor on and off and in order to dampen vibrations and to avoid the transmission of torque from the air compressor to the drive engine or the transmission of the drive engine, the known configuration of filling-controlled hydrodynamic clutches is too complex and not ideally suited for speed monitoring of the work machine, especially the air compressor.

Document U.S. Pat. No. 2,873,831 A describes a hydrodynamic coupling with a centrifugal valve which revolves with the speed of the pump wheel of the hydrodynamic coupling. It can thus be prevented despite the rising speed of the engine that the speed of the work machine will rise further.

Documents FR 1 016 938 A and GB 2 227 078 A also describe hydrodynamic couplings with valves for discharging the working chamber.

Published patent specification DE 32 17 465 A1 proposes for discharging the hydrodynamic coupling in order to stop the turbine wheel that several discharge openings are arranged in the housing of the coupling which are controlled by valves. These valves are closed by a control pressure in lines for filling the coupling leading to the valves and open for discharging when the control pressure does not occur due to the centrifugal force acting upon their valve body. The valve bodies are therefore pressurized on the radial inside by the working medium from the working chamber of the coupling and on their radial outside also by the working medium which when the coupling is switched on is guided into the respective lines when the coupling fills up. A self-switching closed-loop speed control of the hydrodynamic coupling is not possible by such valves because for opening the valves the control pressure which acts radially from the outside on the valve bodies always needs to be degraded by means of an external circuit in such a way that working medium is supplied to the hydrodynamic coupling and thus to the working chamber. This embodiment is therefore unsuitable for limiting the speed of a work machine.

The features known from document DE 32 17 465 A1 are summarized in the preamble of claim 1.

SUMMARY OF THE INVENTION

The invention is based on the object of providing a hydrodynamic coupling and especially a compressed-air system for a motor vehicle with such a hydrodynamic coupling in which a connected work machine or an air compressor is protected effectively from overspeed, with an especially high speed increasing ratio being especially provided in comparison with the state of the art between the combustion engine or the transmission connected to the same and the air compressor in order to operate the air compressor in air conveying operation principally at a higher speed in comparison with the state of the art.

The hydrodynamic coupling in accordance with the invention comprises a pump wheel and a turbine wheel which jointly form a toroidal working chamber which is or can be filled with a working medium in order to transfer driving power from the pump wheel to the turbine wheel. The coupling can thus be arranged as a constant-filling coupling or a flow coupling. In the case of a constant-filling coupling, the working medium remains continually within the hydrodynamic coupling which comprises a compensating chamber for example for the working medium which is conveyed out of the working chamber. In the case of a flow coupling however, an external circulation is provided so that the working medium is conveyed in said circulation into the coupling and out of the same again and is usually cooled outside of the hydrodynamic coupling. Constant-filling couplings make do without such an external circulation.

The pump wheel of the hydrodynamic coupling can be brought into a driving connection with an engine, especially an internal combustion engine of a motor vehicle, or is in driving connection with the same. The turbine wheel of the hydrodynamic coupling can be brought into a driving connection with a work machine, especially an air compressor, e.g. a reciprocating piston air compressor, of a vehicle air system or is in driving connection with the same.

The hydrodynamic coupling in accordance with the invention concerns a so-called coupling with internal wheel drive, which means that the pump wheel is enclosed by the coupling housing, with the latter revolving with the rotational speed of the turbine wheel. The turbine wheel is connected in a torsionally rigid manner for example to a coupling shell and forms the coupling housing jointly with the same. As an alternative it is possible to provide a coupling housing which encloses both the pump wheel as well as the turbine wheel and in which the turbine wheel is inserted in a torsionally rigid manner or with which the turbine wheel is arranged integrally or in one piece.

A centrifugal valve or a plurality of centrifugal valves is inserted into the coupling housing in the region of its outer circumference. Each centrifugal valve comprises a valve body which is actuated by centrifugal force and which is switched in such a way in an outlet of the coupling housing for the working medium from the working chamber that the valve body keeps the outlet closed in the closed state of the centrifugal valve, which means when no or only a very low radial force acts from the outside upon the same, whereas the valve body releases the outlet or opens the centrifugal valve when the radial force acting outwardly upon the valve body exceeds a predetermined value. For this purpose, the valve body of the centrifugal valve is pressurized exclusively on its radially inner side with working medium and on its radial outside exclusively by at least one elastic mechanical pressure element or a plurality of such elastic mechanical pressure elements which act in the closing direction of the centrifugal valve.

The outlet for the working medium from the working chamber or the outlets for the working medium from the working chamber are thus opened or closed depending on the force acting radially to the outside upon the valve body. Said force acting radially to the outside is obtained especially by addition of the centrifugal force acting upon the valve body and the pressure which the working medium pressurizing the valve body exerts upon the valve body. One or usually both forces depend on the speed of the coupling housing and the turbine wheel.

When the work machine rotates with the same speed as the coupling housing or with a speed which is proportional to the speed of the coupling housing, the feedback control of the overspeed protection which is provided by the centrifugal valve introduced in accordance with the invention occurs directly depending on the speed of the work machine, especially depending on the air compressor of a compressed-air system of a motor vehicle, and especially a reciprocating piston air compressor. The reaction time of such a feedback control is exceptionally short and the opening speed of the centrifugal valves or the centrifugal valve is set substantially or completely independent of the slip state of the hydrodynamic coupling or not proportional to the speed of the pump wheel.

The advantage of the use of the centrifugal valve(s) in a coupling housing which revolves with the speed of the turbine wheel, which means a so-called coupling with inside wheel drive, comes with the advantage over a coupling with outside wheel drive in which the housing revolves with the speed of the pump wheel that that no distortion of the release speed of the centrifugal force occurs in such a way that with increasing speed of the hydrodynamic coupling the slip will usually become lower and that thus the ratio between the speed of the pump wheel and the turbine wheel will decrease.

According to one embodiment, the hydrodynamic coupling comprises an annular space which is formed in the region of the outer circumference of the coupling housing and into which working medium flows from the working chamber of the hydrodynamic coupling, e.g. by way of respectively arranged bores in the turbine wheel. The outlet(s) in which a centrifugal valve each is arranged can open into said annular space.

According to one embodiment, one or several further working medium outlets are provided in addition to the outlet(s) with a centrifugal valve each, which working medium outlets are switched parallel to the outlet(s) with the centrifugal valve and which advantageously also open into the said annular space. The additional working medium outlets can be introduced for example in the axial direction or in the radial direction in the housing, especially perpendicular or substantially perpendicular or parallel or substantially parallel to the rotational axis of the hydrodynamic coupling. The further working medium outlets are free from a centrifugal valve and especially comprise a continually opened cross section for discharging working medium from the working chamber, which means that their cross section is not blocked by any valve or flap or the like in order to compensate hysteresis during the closing of the centrifugal valve completely or in part, the at least one outlet with the centrifugal valve is advantageously introduced into the coupling housing in an inclined manner in the circumferential direction relative to the radial direction of the hydrodynamic coupling. The inclination is provided in the rotational direction of the turbine wheel or the coupling housing, as seen radially from the outside to the inside. It is thus ensured that in the case of an acceleration of the turbine wheel, the mass inertia acting upon the valve body exerts a force in the opening direction of the centrifugal valve on the valve body. In the case of an acceleration of the turbine wheel of the hydrodynamic coupling, the centrifugal valve will thus open earlier than a centrifugal valve introduced in the radial direction, with all other boundary conditions remaining unchanged.

It is understood that it is also possible to provide the inclination of the centrifugal valve or the outlet with the centrifugal valve in the opposite direction than the one as described, which means opposite of the direction of rotation of the turbine wheel, so that during the acceleration of the turbine wheel the opening of the centrifugal valve is delayed or the opening is accelerated during the delay of the turbine wheel.

The further working medium outlet(s) can accordingly also be introduced in an inclined manner in the circumferential direction into the coupling housing against the radial direction of the hydrodynamic coupling, with the inclination being provided, as seen radially from the outside to the inside, in the direction of rotation or against the direction of rotation of the turbine wheel.

When a plurality of centrifugal valves has been introduced into the hydrodynamic coupling or its coupling housing, measures can be taken so that the individual centrifugal valves or groups of centrifugal valves will open at different speeds. This can be ensured by providing various masses of the valve bodies and/or different spring strengths of the elastic, mechanical pressure elements.

In addition or as an alternative to the centrifugal valve in the outlet(s) of the coupling housing, one or several centrifugal valves which are arranged for example according to the centrifugal valves for the outlets as described herein can be provided in one or several inlets for working medium into the working chamber of the hydrodynamic coupling. When such a centrifugal valve is introduced into one or several inlets in such a way that as a result of the increasing centrifugal force it opens at rising speed, the degree of filling of the hydrodynamic coupling will be increased disproportionally with rising speed from or in the speed range of the opening of the valve. If the centrifugal valve(s) is/are introduced in such a way however that they will close with increasing speed, the degree of filling of the hydrodynamic coupling will increase in a sub-proportional manner in this range according to the degree of filling. This allows a modification of the usually obtained degree of filling of a hydrodynamic coupling which is arranged without centrifugal valves in the inlet.

As is the case with the centrifugal valve(s) in the outlet, the centrifugal valve(s) can be provided in one or several inlets which are provided in parallel to further inlets which cannot be closed. A change in the inlet cross section is thus achieved by switching the centrifugal valve(s), with the inlet cross section always being larger than zero.

By providing one or several centrifugal valves in the inlet or outlet for working medium into the working chamber or from the working chamber of the hydrodynamic coupling in accordance with the invention, the progress of the characteristic of a hydrodynamic coupling over the speed can be modified in a purposeful way.

A further advantage of the configuration in accordance with the invention is that by preventing undesirable overspeed of the turbine side of the hydrodynamic coupling, the drive of the hydrodynamic coupling and a work machine connected downstream of the same, and an air compressor in particular, can principally be arranged for higher speeds through the choice of a higher speed increasing ratio of more than 1.27, 1.5 or 1.7, especially 1.76, for example. Slip of the hydrodynamic coupling is thus reduced and the profile diameter of the blade profiles and the outside diameter of the hydrodynamic coupling can be provided with a smaller configuration than in known hydrodynamic couplings in order to achieve the same drive result.

BRIEF DESCRIPTION OF THE DRAWINGS

The invention will be explained below in an exemplary manner by way of embodiments shown in the drawings, wherein.

DETAILED DESCRIPTION

Figure 1:
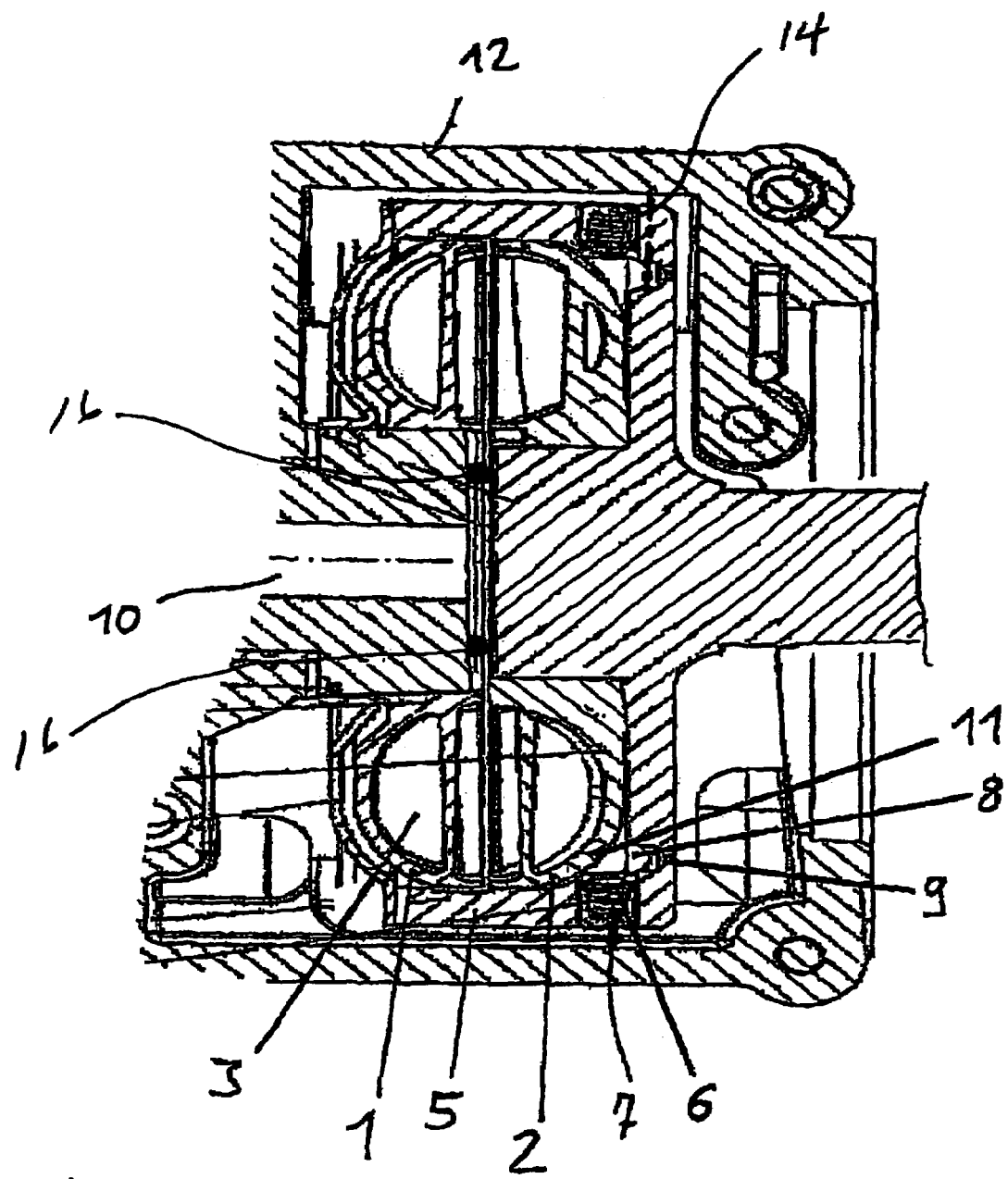
FIG. 1 shows a cross-sectional view through a hydrodynamic coupling arranged in accordance with the invention and comprising a centrifugal valve introduced into the coupling housing.

FIG. 1 shows the pump wheel 1 and the turbine wheel 2 which jointly form a toroidal working chamber 3. The turbine wheel 2 is inserted into a housing 5 and is connected with the same in a torsionally rigid manner. In this case, the turbine wheel 2 touches with its outer circumference the radially outer inside of the housing 5 and with its rear side the inside of the housing 5 on its face side, with the two mentioned insides of the housing 5 which are touched by the turbine wheel 2 standing perpendicularly on each other.

As a result of the described and illustrated embodiment of the housing 5 and the rear side of the same which is arranged in a rounded manner in the radially outer region of the turbine wheel 2 as shown in a cross section, an annular space 8 is formed between the rear side of the turbine wheel 2 and the inside of the housing 5.

At the axially opposite end, the housing 5 encloses the pump wheel 1 in such a way that the pump wheel 1 can rotate opposite of the turbine wheel 2 and within the housing 5 relative to the turbine wheel 2 and the housing 5.

In coupling operation, the working medium flows via the inlet 10 into the working chamber 3. The inlet 10 is guided partly in the form of an axial bore through the shaft which carries the pump wheel 1 and opens through a section in the working chamber 3 facing radially to the outside. The working medium flows from the working chamber 3 through one or usually a plurality of bores 11 through the shell of the turbine wheel 2, which means that the bores 11 open into the annular space 8 on the rear side of the turbine wheel 2.

The working medium can thus form a working medium ring in the annular space 8 and flows further through the working medium outlets 9 which in the present case are introduced in the axial direction of the hydrodynamic coupling. The working medium outlets 9 comprise a cross section which is opened at all times and are introduced in the form of bores into the coupling housing 5 on the face side, such that they open into the annular space 8. As an alternative to the shown embodiment, the working medium outlets 9 can also extend in the radial direction for example, or in an inclined manner relative to the axial direction and/or the radial direction.

In addition to the working medium outlets 9, a plurality of outlets 7 are provided, each with a centrifugal valve 6. The outlets 7 are introduced into the coupling housing 5 in the region of the outer circumference in the form of radial bores. In the shown embodiment, the outlets/with the centrifugal valves 6 are arranged directly radially outside of the turbine wheel 2 and/or the annular channel 8 and open into the annular channel 8.

Above a predetermined speed of 300, 3500 or a range between said two values for example, the centrifugal valves 6 will open and will release flow cross sections in addition to the working medium outlets 9 in order to discharge working medium from the housing 5 of the hydrodynamic coupling.

The working medium discharged from the coupling housing 5 is collected in a trough 12 which encloses the hydrodynamic coupling and can be part of an engine housing and/or a transmission housing or be connected to the same.

Alternatively, the working medium outlets 9 could be oriented to extend in a radial direction of the coupling perpendicularly or substantially perpendicularly to the rotational axis of the coupling as indicated by dashed line 14 in FIG. 1. If desired, the inlet could connect to a centrifugal valve 16, which opens or closes the inlet 10 depending on the speed of the pump wheel 1 and/or the turbine wheel 2.

Figure 1A:
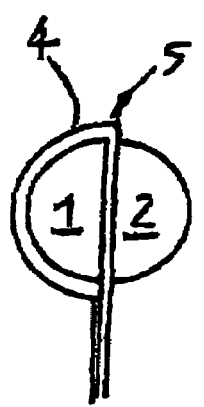
FIG. 1a schematically shows an alternative arrangement of a housing.

FIG. 1a schematically shows a turbine wheel 2 which forms the coupling housing 5 together with a coupling shell 4, which housing encloses the pump wheel 1. The turbine wheel 2 is thus not enclosed by a separate coupling housing 5 but is a part of the same.

Figure 2:
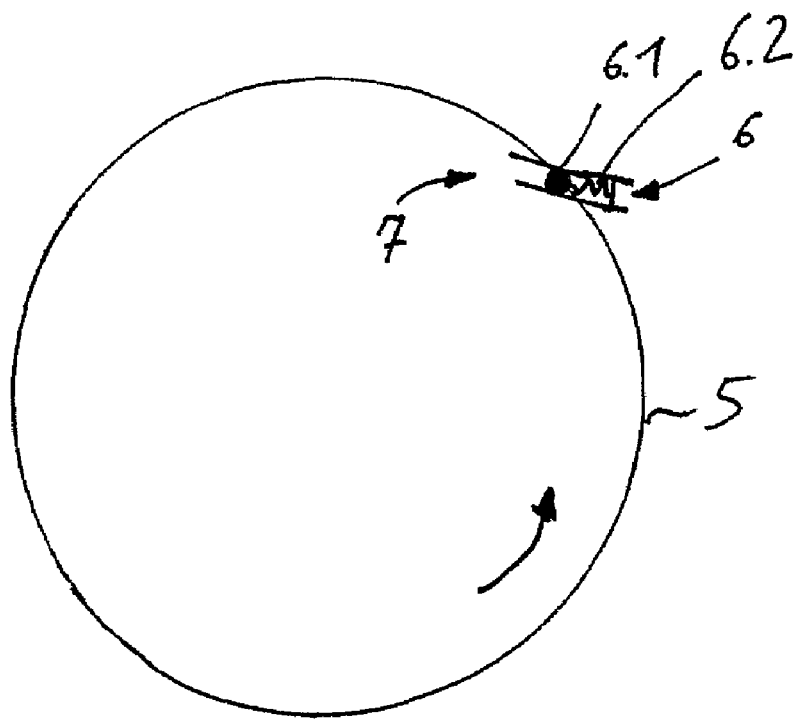
FIG. 2 shows a schematic representation of the inclination of an outlet with a centrifugal valve in the circumferential direction of the housing.

FIG. 2 shows a schematic radial sectional view of a possible inclination of an outlet 7 for the working medium from the working chamber, into which a centrifugal valve 6 is introduced in accordance with the invention. As a result of the direction of rotation of the coupling housing 5 (see arrow), mass inertia of the valve body 6.1 ensures that the same is pressed in the direction of opening against the action of the force of pressure element 6.2 (which is a pressure spring here) in the case of a rotational acceleration of the coupling housing 5.

Figure 3:
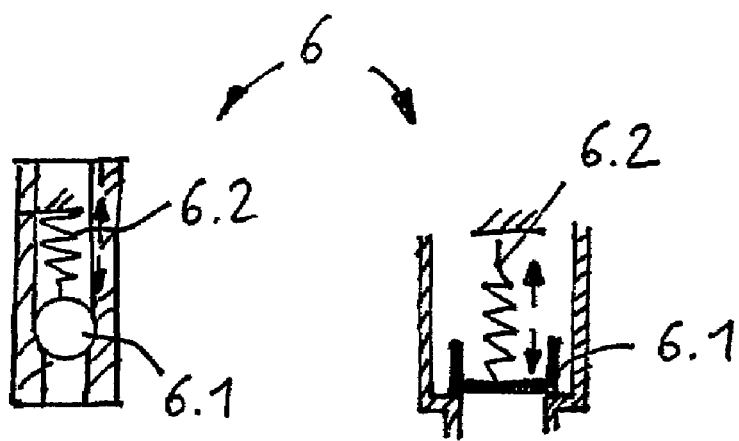
FIG. 3 shows two embodiments for centrifugal valves with valve bodies in a schematic representation.

FIG. 3 shows possible embodiments of centrifugal valves 6 with a valve body 6.1 and a pressure element 6.2. The pressure element 6.2 is arranged as a pressure spring, especially as a spiral pressure spring. According to the embodiment on the left side, the valve body 6.1 is arranged in the form of a massive sphere, which means as a solid sphere. In the embodiment on the right side, the valve body 6.1 is arranged in the form of a cup, with the cup floor being pressurized by the pressure element 6.2 in such a way that it is pressed with its bottom side against a valve seat of the centrifugal valve 6.

The valve body 6.1 in the form of a sphere in the embodiment shown on the left side is accordingly also pressed by the elastic mechanical pressure element 6.2 against a valve seat in order to close the centrifugal valve 6.

The present invention thus allows creating a speed-limited coupling with self-switching centrifugal valves, which means that the centrifugal valves will open and close exclusively as a result of the speed of the housing in which they are introduced, without switching them by an outside controlled control apparatus, such that they are pressurized by a control fluid for example or are opened and closed electromagnetically or mechanically.

The coupling in accordance with the invention is especially suitable for use in a drive train for an air compressor, especially a reciprocating piston compressor. Other uses are also possible, especially in the field of motor vehicles, e.g. in the drive train of a ventilating or cooling fan and/or a water pump, especially of the cooling circulation of the vehicle.

The invention claimed is:

1. A hydrodynamic coupling, comprising:
a pump wheel which is or can be brought into a driving connection with an engine;
a turbine wheel which is or can be brought into a driving connection with a work machine;
the pump wheel and the turbine wheel jointly forming a toroidal working chamber which is or can be filled with a working medium in order to transfer driving power from the pump wheel to the turbine wheel;
the turbine wheel jointly forming a coupling housing with a coupling shell which is connected in a torsionally rigid manner to said turbine wheel, or is inserted in a torsionally rigid manner into a coupling housing, so that the pump wheel is enclosed substantially or completely by the coupling housing;
a centrifugal valve with a valve body actuated by centrifugal force arranged in the coupling housing in the region of its outer circumference, said valve switched in such a way in an outlet for the working medium from the working chamber that the valve body substantially or completely seals the outlet in the closed state of the centrifugal valve and releases the same in the opened state so that working medium flows out;
wherein the valve body of the centrifugal valve is pressurized with working medium only on its side which is radially on the inside, and is pressurized on its side which is radially on the outside only by at least one elastic mechanical pressure element which acts in the closing direction of the centrifugal valve.

2. The hydrodynamic coupling according to claim 1, wherein in the region of its outer circumference the coupling housing forms an annular space which is filled with working medium from the working chamber and into which opens the outlet with the centrifugal valve.

3. The hydrodynamic coupling according to claim 1, including a plurality of outlets which each comprise a respectively arranged centrifugal valve are arranged in the coupling housing.

4. The hydrodynamic coupling according to claim 1, wherein in addition to the outlet which comprises a centrifugal valve at least one further working medium outlet or a plurality of working medium outlets are provided which are free from a centrifugal valve and comprise a continually opened cross section for discharging working medium from the working chamber.

5. The hydrodynamic coupling according to claim 1, wherein the outlet with the centrifugal valve is introduced in an inclined manner in the circumferential direction into the coupling housing relative to the radial direction of the hydrodynamic coupling, with the inclination being provided, as seen radially from the outside to the inside, in the direction of rotation of the turbine wheel.

6. The hydrodynamic coupling according to claim 4, wherein the at least one further working medium outlet is introduced into the coupling housing extending in the axial direction of the hydrodynamic coupling parallel to the rotational axis of the hydrodynamic coupling or substantially parallel to the rotational axis of the hydrodynamic coupling.

7. The hydrodynamic coupling according to claim 4, wherein the at least one further working medium outlet is introduced into the coupling housing extending in the radial direction of the hydrodynamic coupling, especially perpendicularly to the rotational axis of the hydrodynamic coupling or substantially perpendicularly to the rotational axis of the hydrodynamic coupling.

8. The hydrodynamic coupling according to claim 1, wherein the outlet with the centrifugal valve is introduced into the coupling housing together with an annular channel radially outside of the turbine wheel which is inserted in a torsionally rigid manner in the coupling housing or is integrated in the same.

9. The hydrodynamic coupling according to claim 1, wherein the valve body is spherical.

10. The hydrodynamic coupling according to claim 1, wherein the valve body is in the form of a cup with a hollow-cylindrical cross section.

11. The hydrodynamic coupling according to claim 1, wherein the elastic mechanical pressure element is a pressure spring, especially a spiral pressure spring.

12. The hydrodynamic coupling according to claim 3, wherein the centrifugal valves are arranged in such a way with valve bodies of different masses and/or elastic mechanical pressure elements of different spring strength that individual centrifugal valves or groups thereof open at a higher speed of the coupling housing than one or several other centrifugal valves.

13. The hydrodynamic coupling according to claim 1, wherein at least one inlet is provided for supplying working medium to the working chamber and a centrifugal valve is arranged in the at least one inlet which opens or closes the inlet depending on the speed of the pump wheel and/or the turbine wheel.

14. The hydrodynamic coupling according to claim 1, wherein the at least one further working medium outlet is introduced into the coupling housing in an inclined manner in the circumferential direction relative to the radial direction of the hydrodynamic coupling, with the inclination being provided, as seen radially from the outside to the inside, in the direction of rotation or against the direction of rotation of the turbine wheel.

15. A compressed-air system for vehicles with a drive engine and an air compressor, wherein a hydrodynamic coupling according to claim 1 is switched into the drive connection between the drive engine and the air compressor.

16. A cooling system for vehicles with a drive engine and a ventilating fan, wherein a hydrodynamic coupling according to claim 1 is switched into the drive connection between the drive engine and the ventilating fan.

17. A cooling system for vehicles with an internal combustion engine and a cooling medium pump, wherein a hydrodynamic coupling according to claim 1 is switched into the drive connection between the drive engine and the cooling medium pump.

18. The hydrodynamic coupling according to claim 2, including a plurality of outlets which each comprise a respectively arranged centrifugal valve are arranged in the coupling housing.

19. The hydrodynamic coupling according to claim 2, wherein in addition to the outlet which comprises a centrifugal valve at least one further working medium outlet or a plurality of working medium outlets are provided which are free from a centrifugal valve and comprise a continually opened cross section for discharging working medium from the working chamber.

20. The hydrodynamic coupling according to claim 3, wherein in addition to the outlet which comprises a centrifugal valve at least one further working medium outlet or a plurality of working medium outlets are provided which are free from a centrifugal valve and comprise a continually opened cross section for discharging working medium from the working chamber.

* * * * *

UNITED STATES PATENT AND TRADEMARK OFFICE
CERTIFICATE OF CORRECTION

PATENT NO.        : 7,681,391 B2
APPLICATION NO.   : 11/721231
DATED             : March 23, 2010
INVENTOR(S)       : Markus Kley et al.

It is certified that error appears in the above-identified patent and that said Letters Patent is hereby corrected as shown below:

Claim 11, Column 8, Line 46, delete "spring, especially a spiral pressure"

Signed and Sealed this

Twenty-fifth Day of May, 2010

David J. Kappos
*Director of the United States Patent and Trademark Office*